United States Patent
Aharon

(10) Patent No.: US 12,249,103 B2
(45) Date of Patent: Mar. 11, 2025

(54) BEAM PROFILING ENHANCEMENT BY AUTOMATIC GRAYSCALE AND COLOR ADJUSTMENT

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 525 days.

(21) Appl. No.: 17/488,342

(22) Filed: Sep. 29, 2021

(65) Prior Publication Data
US 2023/0100737 A1     Mar. 30, 2023

(51) Int. Cl.
*G06T 3/4053*    (2024.01)
*G06T 7/90*    (2017.01)

(52) U.S. Cl.
CPC ........... *G06T 7/90* (2017.01); *G06T 3/4053* (2013.01)

(58) Field of Classification Search
CPC ..... G06T 7/90; G06T 3/4053; G09G 2360/16; G09G 5/06; G01J 1/4257
USPC .................................................. 382/100, 162
See application file for complete search history.

(56) References Cited

U.S. PATENT DOCUMENTS

| | | | | |
|---|---|---|---|---|
| 6,388,743 B1 * | 5/2002 | Aharon | ................ | G01J 1/4257 356/121 |
| 2009/0323026 A1 * | 12/2009 | Mizushima | .............. | G09G 3/02 345/694 |
| 2010/0156921 A1 * | 6/2010 | McLennan | ................ | G06T 7/90 345/589 |
| 2021/0364413 A1 * | 11/2021 | Bahr | .................. | G01N 15/1459 |

* cited by examiner

Primary Examiner — Sheela C Chawan

(57) ABSTRACT

The present invention relates to laser beam profiling, more specifically to weak signals which are barely identified on a display screen representing the beam levels by color or gray palettes. Each displayed pixel on a beam profiling image represents the amount of laser power on said pixel. This represents the intensity information on a specific pixel. Integrating the pixel intensity information over the whole image will calculate the total power. Seldom, especially in high resolution cameras, the displayed information is indiscernible on the screen. However, there is enough information to observe the beam profile if the color or grayscale palette is displayed as percentage values of maximum intensity on the screen. Then, each percentage level will be assigned with a different color. By doing that, even very poor levels of displayed images could be enhanced to span over a full color or grayscale palette. The disclosed method is characterized by initially finding the maximum level of an image by histogram, then divide each pixel value by the maximum value found in the histogram, followed by displaying an image which has colors according to the percentage of power of each pixel relative to the maximum histogram level. This procedure can be performed either manually where the user adjusts the palette maximum, or automatically where software finds maximum level on histogram and spans the color palette onto the image percentage from maximum.

3 Claims, 3 Drawing Sheets

BEAM PROFILING ENHANCEMENT BY AUTOMATIC GRAYSCALE AND COLOR ADJUSTMENT

BACKGROUND OF THE INVENTION

1. Field of Invention

The invention relates to an algorithm and method to enhance a beam profile display presented to a user in such a way that color palettes span over the digital information available from electronic A/D. The invention also relates to the necessary GUI to emphasize the mode of color spanning out of the total possible A/D information for this specific beam profile.

2. Description of the Related Art

The laser beam profiling technology is based on capturing and then displaying the spatial intensity profile of a beam in a plane which is perpendicular to the laser propagation axis. Although there are many types of lasers with a large variety of instrumentation dedicated to perform the capturing action, the spatial intensity profile is similarly displayed for all solutions in a colorimetric way which assigns a value to the numeric sample level. Seldom, the beam has relatively low values out of the maximum numerical display capability of the hardware. In this case, the displayed image will look very vague and almost indistinguishable. It is the purpose of this invention to offer a solution that uses all available color palettes over the actual maximum numerical values assigned to the beam.

SUMMARY

Algorithm and method for laser profile display with color palette distribution spanning over the relevant numerical data for a specific beam is disclosed. The method may include (1) capturing an image from a laser beam in a digital format; (2) using said image histogram to identify the maximum level of relevant laser beam profile information; (3) using this information to create a ratio of each level of pixel information to said maximum value, similar to percentage calculation (the maximum level will be 100% or 1); (4) assigning a color out of the color palettes from zero to 100; (5) displaying this canonized information on user display; (6) clearly showing the maximum used level for this specific beam relative to the maximum possible value;

The proposed algorithm will be adapted to each available computer operating system to perform the necessary colorimetric weak laser beam display.

BRIEF DESCRIPTION OF THE DRAWINGS

For a better understanding of the present invention and its advantages thereof, accompanied drawings and detailed description follow.

DETAILED DESCRIPTION OF THE DRAWINGS

Figure 1:
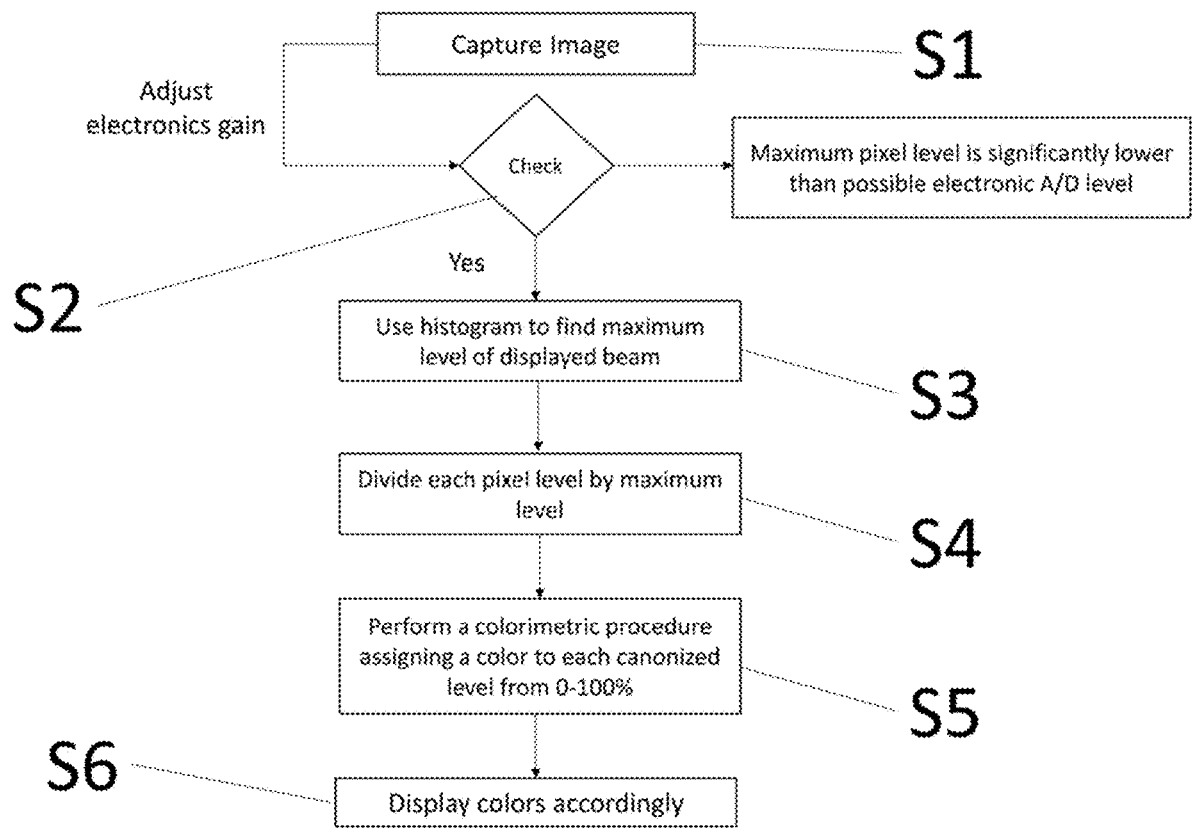
FIG. 1 describes a block diagram showing the various stages used the colorimetric procedure as applied to laser beam profiler.

A method for laser beam display profile reconstruction is based on determining the histogram of said display profile reconstruction, finding the pixel maximum level and its value and creating an image based on the ration of each pixel relative to said maximum and assigning a color out of the colors palette to perform colorization of the image according to said maximum level. Moreover, the said maximum value will be clearly displayed out of the maximum level possible as provided by A/D electronics. FIG. 1 shows a flowchart illustrating the method performing colorimetric procedure assigning a color to each canonized level from 0-100%, which was calculated by the ratio of various pixels to the maximum detected level from captured signals. The colorimetric assigning procedure starts with a captured image received after the digitization where each pixel is assigned with a level according to the used A/D capability. The procedure includes first of all scanning the pixels and verifying that there are no saturated pixels. As such, block S1 represents the image capturing action where S2 is the action for verifying that the maximum level displayed is lower than the maximum allowable digitization. Block S3 uses a very familiar histogram algorithm which finds how many pixels and at what level are the captured images. Using this information, next action is to divide the value of each pixel by the maximum value in the displayed image as described in S4 and creating a new similar histogram which each pixel level has a relative value when compared to the maximum in the captured image. Next action as described by S5 is to assign a specific color to each level by using the colorimetric procedure. Finally, S6 is the displayed image using this colorimetric procedure.

Figure 2:
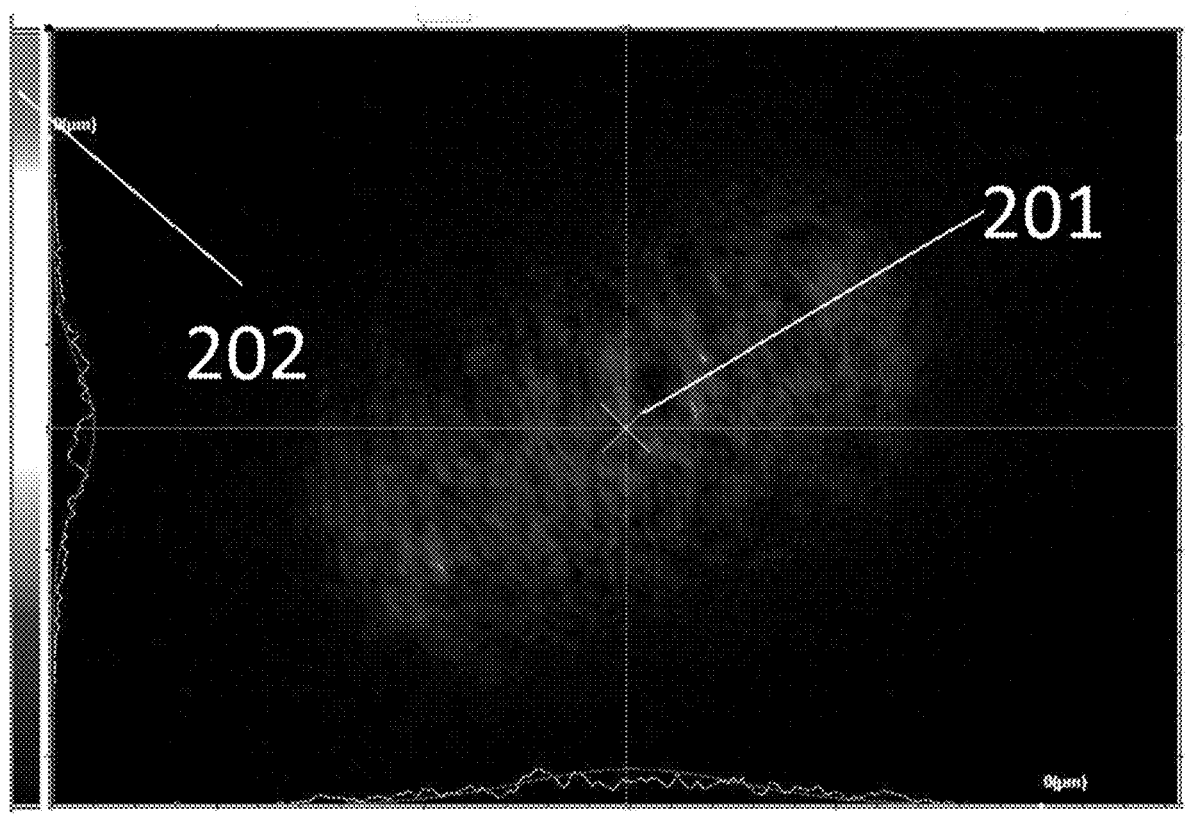
FIG. 2 depicts an image where the beam is not processed by the colorimetric procedure showing an almost undistinguishable beam profile.

FIG. 2 is a displayed image in a computer screen where the colorimetric procedure was not applied, and the representation of the laser beam profile on the screen is very vague. 201 points at the center of the beam which clearly demonstrates the inability to discern the beam's features and structure. 202 shows that the assigned colors span over the available digital information as provided by hardware.

Figure 3:
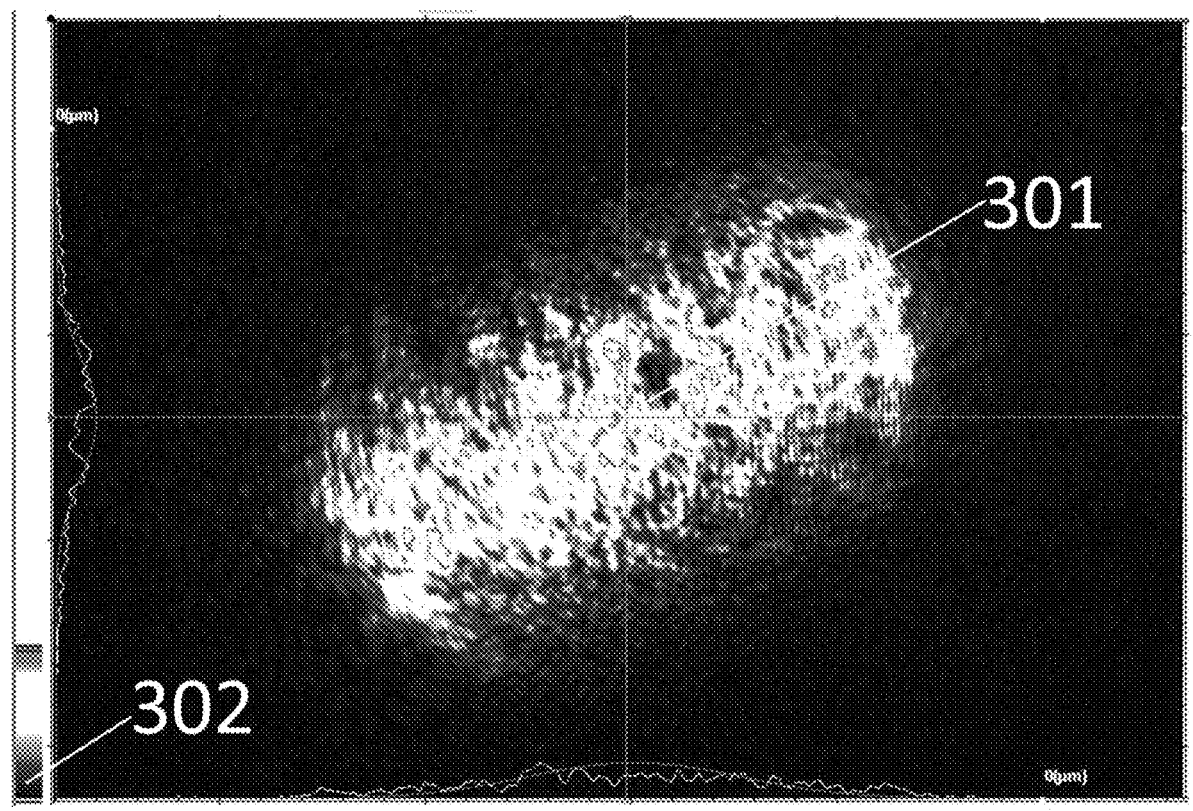
FIG. 3 describes the laser beam profile using the same laser input but with an activated colorimetric improvement method.

FIG. 3 is the same image representing the same laser beam power distribution where the colorimetric procedure was applied to create a well-defined image distribution of the laser beam. 301 points at the center of said beam, and 302 shows the level which represents now the full colorimetric span relative to the maximum digital information as provided by hardware.

It is to be understood that these drawing disclosures is exemplary and not intended to limit the present invention.

The invention claimed is:

1. A method for laser beam visualization comprising:
   presenting an image representing a laser beam's profile;
   analyzing the relevant histogram of said image;
   identifying the pixels with the highest intensity and determining their values; and
   creating a ratio of each pixel on the image relative to said maximum value assigning colors from a predefined palette to achieve colorization of the image in accordance with the maximum intensity value.

2. The method of claim 1, wherein the maximum intensity level used for computing the relative pixel ratios is displayed in relation to the maximum achievable intensity level provided by A/D electronics.

3. The method of claim 1, wherein the colorization is derived on a grayscale palette.

* * * * *